United States Patent [19]
White

[11] 3,992,573
[45] Nov. 16, 1976

[54] STEREOSCOPIC VIEWER POWER SUPPLY
[75] Inventor: Robert E. White, La Mesa, Calif.
[73] Assignee: The United States of America as represented by the Secretary of the Navy, Washington, D.C.
[22] Filed: Nov. 19, 1975
[21] Appl. No.: 633,523

[52] U.S. Cl. .......................... 178/6.5; 178/DIG. 11
[51] Int. Cl.² ........................................ H04N 9/54
[58] Field of Search ...................... 178/6.5, DIG. 11

[56] References Cited
UNITED STATES PATENTS
3,737,567   6/1973   Kratomi .............................. 178/6.5
3,903,358   9/1975   Roese ................................. 178/6.5

Primary Examiner—Robert L. Richardson
Attorney, Agent, or Firm—Richard S. Sciascia; Ervin F. Johnston; William T. Skeer

[57] ABSTRACT

An improved power supply for alternate frame stereoscopic image presentation system includes a switch circuit for triggering two light valves mounted to present alternate left-right images to a viewer. A delay circuit using a variable pulse length monostable multivibrator permits the length of the "on" time to be adjusted to prevent light valve delays from introducing stereoscopic "ghosts".

4 Claims, 4 Drawing Figures

STEREOSCOPIC VIEWER POWER SUPPLY

STATEMENT OF GOVERNMENT INTEREST

The invention described herein may be manufactured and used by or for the Government of the United States of America for governmental purposes without the payment of any royalties thereon or therefor.

FIELD OF THE INVENTION

The invention pertains generally to the field of electro-optics. More particularly, this invention pertains to the field of stereoscopic image presentation. In greater particularity, this invention pertains to stereoscopic television. By way of further characterization, the invention pertains to a drive circuit for a stereoscopic viewer-analyzer which is designed to cooperate with an alternate-image stereoscopic presentation of alternate left-right images. By way of further characterization, this invention pertains to a viewer-analyzer drive which has a variable-length switching pulse output.

DESCRIPTION OF THE PRIOR ART

The field of stereoscopic television is a relatively new branch of the electro-optical arts. However, despite its relative newness, the prior art includes several operational systems. Although each of these operational systems have contributed to the advance of the fund of knowledge in this highly important branch of electro-optics, each of these systems have principal drawbacks which limit their general applicability.

A particular problem often encountered is termed "ghosting" in the stereoscopic viewing arts. In this problem area, the right-eye viewing channel sometimes contain a reduced intensity left-eye image. This problem may be produced by a variety of causes, however, the most frequent cause is the failure of the light valve used in the viewer-analyzer to follow accurately the control voltage. Great improvements have been effected in recent times in the decay or turn-off time of these devices, however, even in the best of the valves a finite decay time exists such that some of the left-eye channel information is transmitted by the right channel and vice versa.

SUMMARY OF THE INVENTION

The present invention provides a power supply and a switching circuit for synchronous operation of a stereoscopic viewer-analyzer. The switching circuit provides for a variable width trigger pulse without alteration of the duty cycle.

STATEMENTS OF THE OBJECTS OF INVENTION

It is accordingly an object of this invention to provide a new and improved power supply for a stereoscopic viewer-analyzer.

A further object of the present invention is to provide a new and improved stereoscopic viewer-analyzer energization circuit to be used with television systems.

Still a further object of the present invention is to provide a stereoscopic viewer-analyzer synchronizing system for use with alternate image television stereoscopic displays.

A still further object of the present invention is to provide an improved synchronizer for stereoscopic viewer-analyzer employing a PLZT light valve.

Yet another object of this invention is the provision of a synchronizer for a light valve system providing for individual decay time switching characteristics of the light valve.

Still another object of this invention is the provision of a stereoscopic synchronizer having a variable pulse-width switching output.

A still further object of this invention is the provision of a stereoscopic synchronizer having a variable pulse width output which is triggered by the scan start signal from a television monitor.

These and other objects of the invention will become more readily apparent from the ensuing specification when taken together with the appended claims and drawings.

DESCRIPTION OF THE PREFERRED EMBODIMENT

Figure 1:
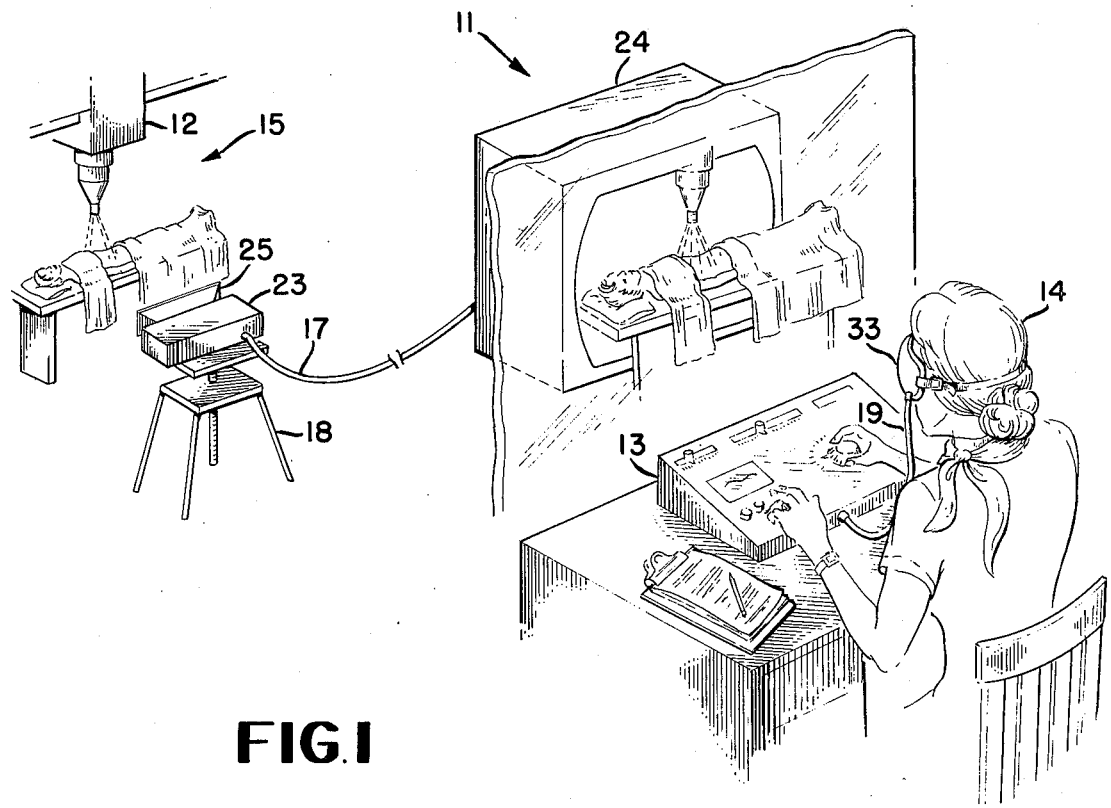
FIG. 1 is a perspective view of a system of the invention in an operational environment.

Referring to FIG. 1, television system employing the viewer-analyzer of the invention is generally illustrated at 11. As shown, a television monitor 24 is positioned in front of a console 13 by which an operator 14 controls a distant mechanism 12 which is included within the general view 15 displayed on monitor 24. Mechanism 12 may be, for example, a high intensity X-ray, the eminations of which would be injurious to operator 14 if exposed thereto for prolonged periods.

Monitor 24 receives the image of scene 15 via camera 23 which is connected to monitor 24 by a suitable communications link such as, for example, the coaxial cable 17. A suitable support 18 positions the camera 23 such that the scene 15 falls within the field of the system. An optical beam splitter 25 provides camera 23 with a time related stereoscopic image path.

Figure 2:
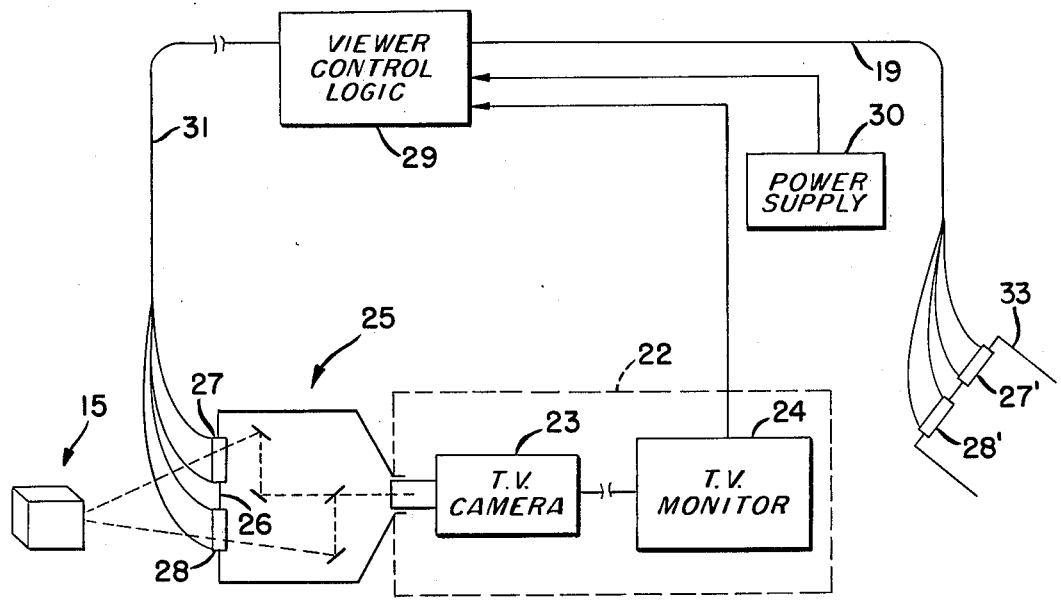
FIG. 2 is a diagrammatic representation of the system illustrated in FIG. 1.

Referring to FIG. 2, a diagrammatic view of the system illustrated in FIG. 1 is presented. As shown, camera 23 and monitor 24 provide the basis of a standard cable TV system indicated generally at 22. A connection made to monitor 24 supplies frame or scan synchronization pulses to viewer control logic circuit 29. It should be noted, that both individual frame or interlace synchronization may be employed in the system of the invention depending upon well recognized trade-offs in resolution and motion stopping power. That is, the normal television picture, like a motion picture presentation, is comprised by a plurality of individual scenes called frames, from the motion picture equivalent, and these frames, or scenes, are presented in such a sequence that, due to the persistency of vision of operator 14, an apparent continuous motion is obtained. Each frame is composed of two scans of an electron beam which lie between alternate traces of the preceeding scan. Thus, each of these two scans are interlaced at such a rate that the visual persistence of the observer integrates them into a single image. Thus, viewer control logic circuit 29 may function to provide appropriate switching signals based upon either the frame or the interlace pulse as desired by other parameters of the system.

The conventional power supply 30 is connected to viewer control logic 29 and provides the switching voltage necessary to operate the light valves in the stereoscopic beam spreader 25 as well as the viewer analyzer 33 worn by operator 14. As shown, viewer control logic 29 also has an output which is connected by conductor 31 to stereoscopic beam splitter 25. Each of the beam splitters and viewer-analyzer includes two solid state light valves shown at 27, 28, 27' and 28'. Beam splitter light valves indicated at 27' and 28' are mounted within apertures in the front wall of beam spreader housing 25 where they cooperate with internal front surface reflectors and semi-reflectors to provide the left and right images in a fashion which is well understood in the optics arts.

Figure 3:
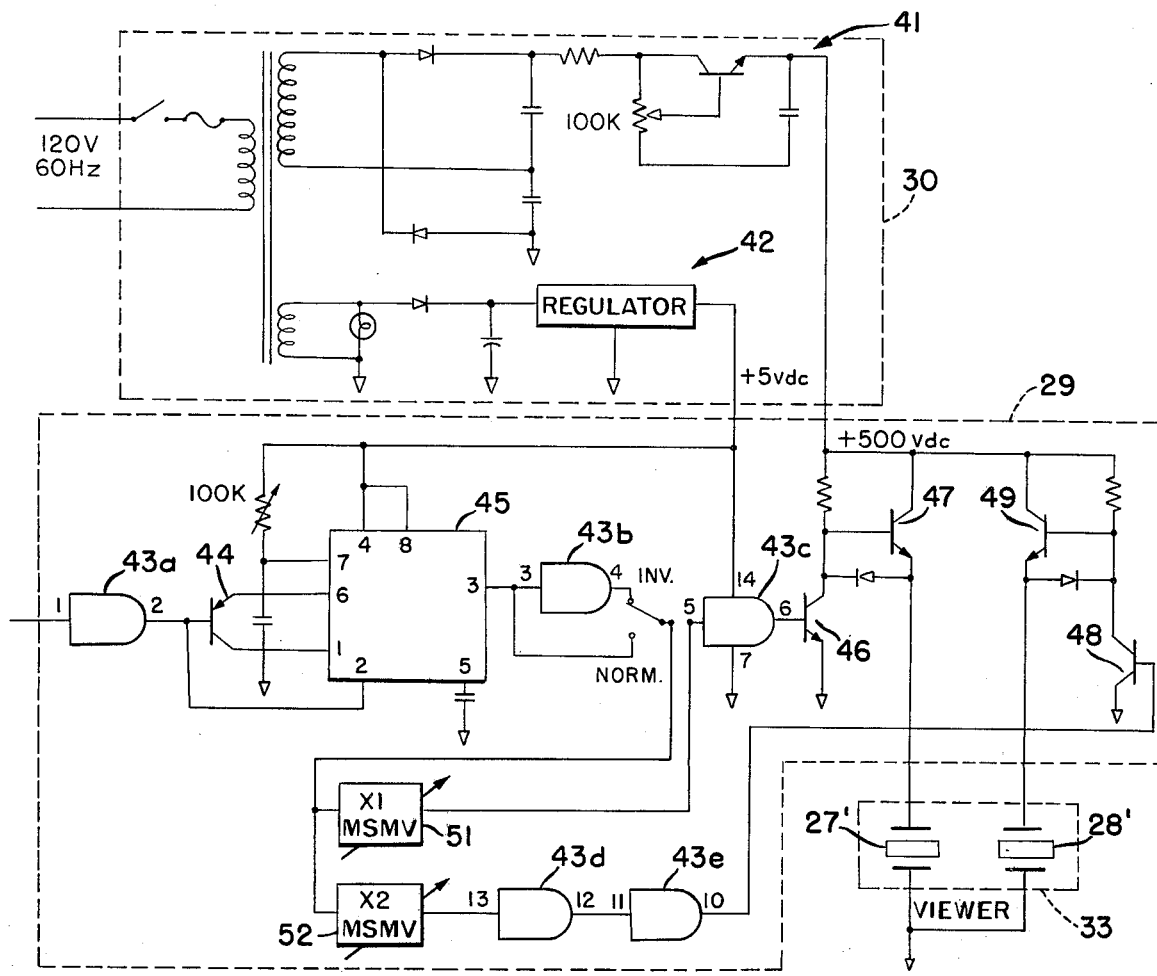
FIG. 3 is a diagrammatic view of the control logic circuit and power supply circuits illustrated in FIG. 2 showing greater detail.

According to FIG. 3, a diagrammatic view, the circuitry comprising power supply 30 and viewer control logic circuit 29 of FIG. 2 is shown in greater detail. As illustrated, power supply 30 receives a power signal from the power means and provides for switching and fusing of this voltage to the transformer where it is stepped up to an operating voltage for viewer 33 by means of a voltage doubler rectifier circuit which employs a solid state regulator to provide a regulated direct circuit output control voltage.

A transformer also steps down the power main voltage to provide for operating potential for the solid state circuitry after suitable rectification and regulation. The regulation circuit is not shown in detail but referred to generally as 42 which may, for example, incorporate a solid state regulator device such as employed in regulator 41. Alternatively, any low-voltage dc regulator circuit known in the prior art may be used for regulator 42 is desired.

It should be noted that transformer operated power supplies of the type illustrated are relatively common and well understood in the electronics arts and need not be described in greater detail herein.

Figure 4:
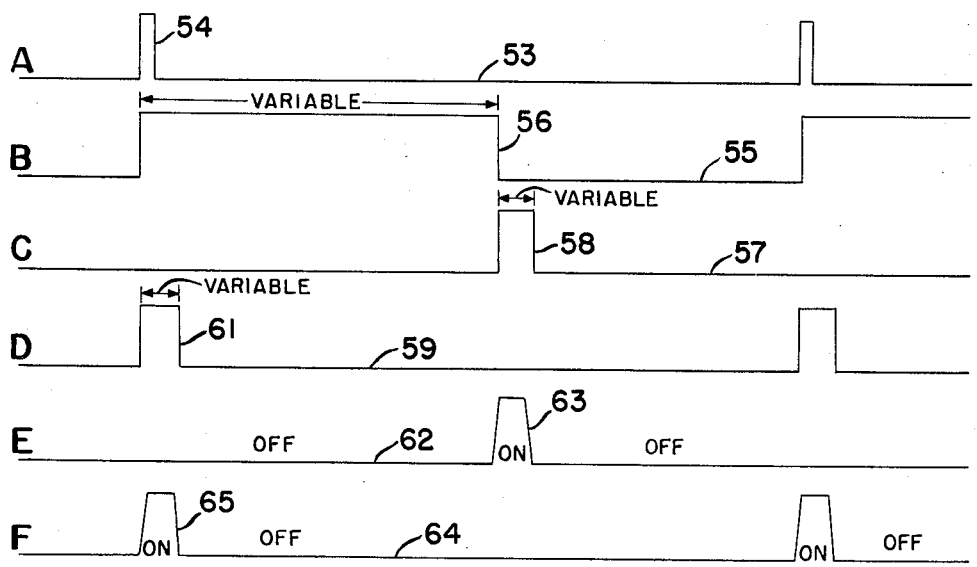
FIG. 4 is a waveform diagram showing the characteristics of the operating waveforms of the circuit of FIG. 3.

Referring to FIG. 4, a plurality of waveforms are illustrated which will be referred to in the description of the remaining circuitry illustrated in FIG. 3.

As illustrated, viewer control logic circuit 29 receives a synchronizing pulse from the appropriate TV monitor or TV camera circuit to provide a plurality of synchronizing pulses 54 which are illustrated in FIG. 4a as vertical square-wave pulses 54 rising positively from a d.c. wave form 53. These pulses are fed to an inverter illustrated at 43a which may conveniently be one section of a multiple inverter solid state package. Such multiple inverter packages are well known in the art and may, for example, be a section of that sold under the trade designator SN7404. The output of the inverter 43a is voltage amplified by means of a solid state amplifier 44 to provide appropriate operation levels to trigger monostable multivibrator 45. Monostable multivibrator 45 is also a solid state, commercial available unit and may, for example, be that marketed under the trade designation NE555.

The output of monostable multivibrator 45 may be adjusted in time duration by conventional means such as a variable resistance connected in the feed back path and may be adjusted to divide a time period between synchronizing pulses 54 into two equal portions as illustrated at FIG. 4b where square wave 56 extends positively upward from a reference waveform 55 to provide equal time periods for the left and right light valves used in viewer 33.

In prior art embodiments, shows the output of monostable multivibrator 45 which was used as a logic gate for the viewer light valves. However, as previously suggested, if the individual light valves have an "on" period as long as half the desired time interval, the decay time of the individual valve caused left-right ghosting such that maximum stereoscopic presentation becomes difficult to obtain.

However, the synchronizer 29 further processes this signal to obtain a more readily controllable gating signal which may be adjusted for the response time of various light valves. As shown, the output from monostable multivibrator 45 is connected to the input of a pair of monostable multivibrators 51 and 52. Monostable multivibrators 51 and 52 are also adjustable in pulse duration in a fashion similar to that of monostable multivibrator 45. In this fashion adjustable width switching pulses may be obtained to regulate the "on" time of the individual light valves used in viewer 33. Of course, beam splitter 25 may be similarly controlled.

As shown, this output is connected to monostable multivibrators 51 and 52 either directly or via a suitable inverter 43b which, for purposes of compactness, may be a second section of a same multi-inverter which initially processed the synchronizing pulses. In fact, as is conventional electronic arts, all of the inverters used in circuit of FIG. 3 may be component parts of a single micro circuit. The output of monostable multivibrator 51 is adjusted to provide a variable positive pulse 58 from a dc waveform 57, which is fed to an inverter 43c which is used to trigger a voltage amplifier 46 which, in turn, is used to control a solid state switch 47 to apply the 500 volt dc potential to light valve 27' used in viewer 33.

In a similar fashion, the output of monostable multivibrator 52 is triggered by the positive going portion of pulse 56 to provide a variable pulse-width control-pulse 61 on a dc waveform 59. This output is connected to a pair of inverters 43d and 43e to provide the necessary symmetry of the control pulses for the light valve 28' in viewer 33. In the same fashion as previously described, these pulses are applied to a solid state amplifier 48 which in turn triggers a solid state start switch 49 to provide the necessary keying of the 500 volt dc signal for a light valve 28' in viewer 33. Because of the load presented by the individual light valves, and other circuit elements, a slight shaping of the actual control pulse occurs as shown in pulses 63 and 65. Thus, it may be seen that the voltage applied to each light valve is controllable to occupy only a small fraction of the viewing interval provided by the synchronizing pulses 54. In this fashion, adequate synchronization for the interlace scans may be obtained which allows for a normal decay time of the individual light valves used.

Thus, when light valves 27' and 28' are liquid crystals which have a fairly long decay time the control pulse width of pulses 63 and 65 may be adjusted to be quite short relative to the entire viewing period available. However, when PLZT crystals are employed as light valves, the pulses may be lengthened to account for the relatively rapid decay time made possible by these light valves.

Thus, it may be seen that an improved power supply and viewing synchronizer is provided for a stereoscopic viewing system which will permit adaptation to a wide variety of viewer types and viewing conditions.

The foregoing description taken together with the dependent claims constitute a disclosure such as to enable a person skilled in the electronics and electro-optical arts, and having the benefit of the teachings contained therein, to make and use the invention. Further, the structure herein described meets the objects of invention and generally constitutes a meritorious advance in the art unobvious to such an artisan not having the benefit of these teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. In a stereoscopic viewing system a power supply and synchronizer comprising:
    means for developing a dc switching potential including two time-related waveforms;
    control means connected to said switching potential means for applying said switching potential waveforms to a viewer having two complementary channels for selective length periods, and including timing circuit means which limits the total time duration of the application of the switching potentials to less than one-half of the total viewing interval required to present a left-right image pair; and
    logic circuit means connected to said control means for synchronizing the application of the switching potential with an external signal.

2. A stereoscopic power supply and synchronizer according to claim 1 in which said timing circuit means includes at least one monostable multivibrator having an adjustable pulse width.

3. A stereoscopic power supply and synchronizer according to claim 2 in which at least one of said monostable multivibrator means is included in each of said two complementary channels.

4. A stereoscopic power supply and synchronizer according to claim 3 further including means to selectively alter the signals fed to the timing means in each of said two complementary channels so as to effect a reversal of the time-related waveforms to effectively produce a reversal of the two complementary channels which gives rise to a left-to-right reversal of the stereoscope.

* * * * *